UNITED STATES PATENT OFFICE.

EMIL FISCHER, OF SCHÖNEBERG, NEAR BERLIN, GERMANY, ASSIGNOR TO SIEMENS & HALSKE, A. G., OF BERLIN, GERMANY, A CORPORATION OF GERMANY.

METHOD OF MANUFACTURING SOLUTIONS OF CAOUTCHOUC.

No. 910,520.     Specification of Letters Patent.     Patented Jan. 26, 1909.

Application filed January 16, 1908. Serial No. 411,137.

*To all whom it may concern:*

Be it known that I, EMIL FISCHER, a subject of the German Emperor, and residing at Coburgerstrasse 17, Schöneberg, near Berlin, Germany, have invented a new and useful Improved Method of Manufacturing Solutions of Caoutchouc, of which the following is a specification.

The present invention relates to a method of manufacturing solutions of caoutchouc.

Hitherto numerous solvents have been proposed for raw caoutchouc, but only few of them, such as, for example, carbon disulfid, benzene, chloroform, carbon tetrachlorid, etc. have been employed extensively commercially for obtaining caoutchouc solutions. Many defects however are attached to all those solvents, such as either easy inflammability or too high specific weight or anesthetizing action. Further, it has been found that for the purpose of obtaining concentrated caoutchouc solutions the dissolving power of most of the above mentioned solvents is not sufficient, or the caoutchouc is only soaked or steeped in the liquid instead of dissolved.

A solvent which does not possess the last mentioned defects has been found in symmetrical dichlorethylene ClHC:CHCl. This substance was proposed quite generally as a valuable solvent in the British Patent Specification 19,568 of 1904, but was never recognized as an exceptionally important solvent of caoutchouc.

Now according to my investigations it has been found that, with regard to its solvent power, dichlorethylene considerably excels even chloroform and ethan tetrachlorid which were formerly known as the best dissolving materials, as the following numbers prove. 10 g. of each of two kinds of raw caoutchouc stood 24 hours at an ordinary temperature with 250 c. cms. solvent with frequent stirring and the following quantities of caoutchouc were dissolved:

| | Pará raw Caoutchouc. | Borneo raw Caoutchouc. |
|---|---|---|
| Dichlorethylene (spec. wgt. 1.2094) | 99.5% | 95.9% |
| Ethan tetrachlorid (spec. wgt. 1.588) | 75.6% | 46.4% |
| Chloroform (spec. wgt. 1.494) | 74.9% | 56.8% |

The new solvent dichlorethylene, a translucent liquid boiling at 55° C., possesses the following additional advantages as compared with liquids used hitherto in the art for manufacturing caoutchouc solutions:

1. At the ordinary temperature of a room it has a very considerably greater power of dissolving raw caoutchouc. The solutions obtained with it, including even those most concentrated, are completely homogeneous and free from lumps.

2. Greater liquidity in consequence of the low boiling point.

3. It is incombustible, and does not generate explosive mixtures of gases or vapors when heated.

4. It has a lower specific weight than those known solvents which are nearest to dichlorethylene with regard to solvent power.

Example. For preparing an approx. 3% Pará raw caoutchouc solution, 2.5 liters dichlorethylene are added to 100 g. comminuted raw caoutchouc, and the mixture is left standing with frequent stirring, without or with the application of heat, until a uniform solution is obtained.

What I claim as my invention and desire to secure by Letters Patent is:—

A method of manufacturing caoutchouc solution consisting in treating raw caoutchouc with symmetrical dichlorethylene.

In testimony whereof I have signed my name to this specification in the presence of two witnesses.

EMIL FISCHER.

Witnesses:
WOLDEMAR HAUPT,
HENRY HASPER.